Jan. 27, 1931.  A. S. SPEER  1,790,252
PLASTER BOARD MANUFACTURE
Filed Jan. 12, 1927  2 Sheets-Sheet 2
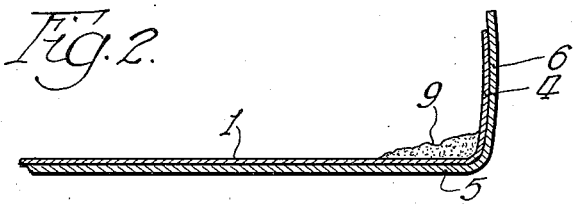
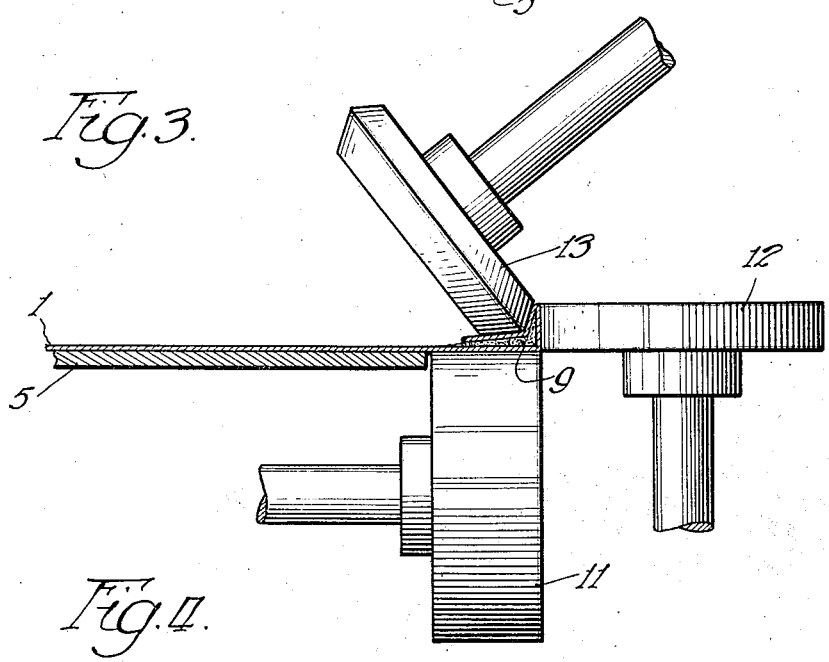
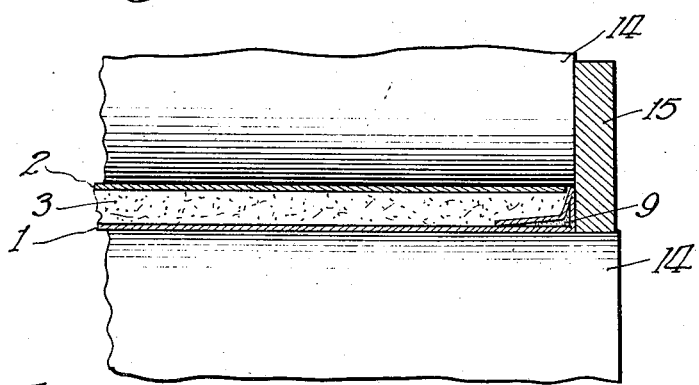
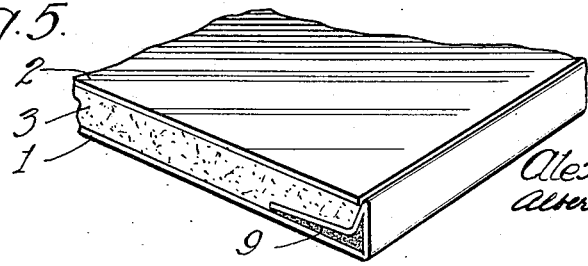
Inventor
Alexander S. Speer.
Albert N. Robinson
Atty Patented Jan. 27, 1931

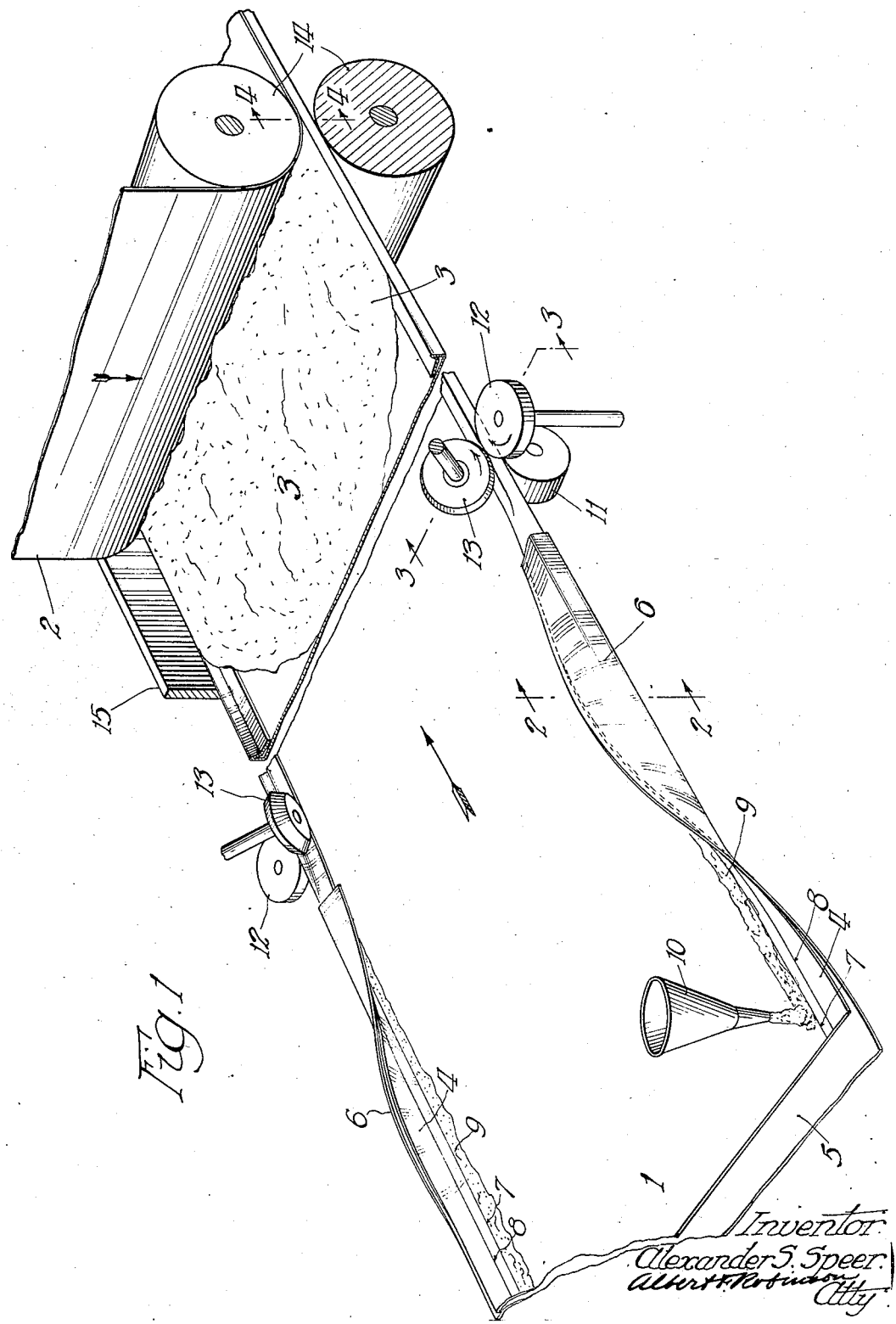

1,790,252

UNITED STATES PATENT OFFICE

ALEXANDER S. SPEER, OF BUFFALO, NEW YORK, ASSIGNOR, BY MESNE ASSIGNMENTS, TO CERTAIN-TEED PRODUCTS CORPORATION, A CORPORATION OF MARYLAND

PLASTER-BOARD MANUFACTURE

Application filed January 12, 1927. Serial No. 160,585.

This invention pertains to the manufacture of composite boards and the like, and among other objects aims to provide a new and superior type of board.

The invention consists in the novel combinations and methods, herein described or claimed, for carrying out the above object and such other objects as will hereinafter appear.

The character of the invention may be best understood by referring to one illustrative construction embodying the invention, such as that shown for example, in the accompanying drawings, in which:

Fig. 1 is a view in perspective of a board forming apparatus and board during the process of the board construction;

Fig. 2 is a view taken on line 2—2 of Fig. 1;
Fig. 3 is a view taken on line 3—3 of Fig. 1;
Fig. 4 is a view taken on line 4—4 of Fig. 1;
Fig. 5 is a perspective view of the completely formed board.

The illustrative composite board is typified herein by a plaster board or the like which is composed of a plastic body material contained between two fibrous cover sheets, one at least of the cover sheets having its margins folded and strengthened to reenforce the corners and edges of the plastic body. In the present instance, the margins of the bottom sheet are folded over the edges of the plastic body and retroverted to reenforce the edges and corners of the sheet, there being a colored strengthening material inclosed by the margins to further reenforce the edges of the sheet and render a distinctive marking to the finished board. While only the bottom sheet is illustrated with overturned edges it will be understood that the margins of the upper sheet may be appropriately folded or reenforced and made distinctive.

According to the illustrative method of manufacture the board is made in a continuous strip with one of the cover sheets preformed into a trough-like container or mold and also advantageously reenforced along the edges, and after an interval plastic material is deposited in the container or mold and covered with another cover sheet. Thus constructed, the board is then subjected to forming devices or rolls which reduce it to the proper thickness. At any appropriate period, subsequently to forming, the board may be cut into suitable lengths and transferred to dryers where all excess moisture is removed.

Referring to illustrative apparatus and process shown in the drawings, two cover sheets 1 and 2 are fed from supply rolls into the receiving end of the apparatus, sheet 1 being first formed to receive a plastic body material 3 and the other sheet 2 being adhered thereto for covering the body material.

Bottom cover sheet 1 is constructed to provide distinctive and reenforced edges, and is adapted to form a trough or receptacle into which the plastic body may be poured and contained during the formation of the board. Such a structure is accomplished in this instance, by turning or folding margins 4 upwardly and retroverting them to inclose a distinctive plaster core which will have first been deposited in a thin ribbon along the margins of the sheet, after which the core is subjected to pressure for accelerating setting thereof and intimately bonding it to the sheet. The sheet is cut to the proper width and traversed over plate 5 which has on opposite sides folding horns 6 to engage and overturn the margins. Folding of the margins is facilitated by scoring the sheet along lines 7 and 8 by any conventional scoring device.

Plastic material 9 advantageously distinctively colored, is deposited on the bottom sheet along the margins of the sheet near score line 7 in a thin stream from a source 10, after which it is inclosed by the folded margins and pressed into a thin layer with the folded margins approximating the contour of the underlying sheet. This plastic material may advantageously differ in kind or color from that plastic material which makes up the body of the board, or it may differ only in color. It will be referred to throughout the specification and claims as colored plastic material to distinguish from the plaster body material. The colored plaster, for example, may be ordinary gypsum plaster colored red to contrast with its original color which is substantially white. Or the colored plaster may be of a material which will not only produce distinctive edges but one specially prepared which will also give strengthened or reenforced edges. Edges which contrast with the main body portion of the board are distinguishing and distinctive, thereby serving admirably for trade-mark purposes.

After being folded to enclose the colored plaster, the margins of the lower sheet are subjected to pressure means which accelerate the setting of the plaster, bond the plaster to the sheet and form the margins into the desired shape. Pressure means for shaping the edges are illustrated by supporting roll 11 over which the paper traverses, edge roll 12, and pressure roll 13. Supporting roll 11 and edge roll 12 are cylindrical in configuration and are preferably arranged at right angles to each other to provide a square corner on the sheet. Pressure roll 13 has a double conical periphery for cooperating with the overturned margin to carry the folded edges inwardly and to squeeze the colored plaster into a relatively thin layer which is intimately bonded with the sheet. Pressure hastens setting, and hence the formed edges are rigid and strong enough to act as a trough for receiving and holding the plaster. Rollers of different contour or the present rollers differently arranged will give various shapes to the overturned margins and the colored plaster. After the pressure is applied to the margins, the sheet is thus formed into a substantial rigid trough-like container ready to receive the plaster body material which is distributed uniformly over the sheet between the upturned edges.

Top sheet 2 is narrowed to the proper width and brought into union with the plaster as the board thus constructed is subjected to pressure rolls 14. Preferably sheet 2 is narrowed to seat on the plaster body and lie substantially flush with the upturned edges. The colored plaster is sufficiently rigid to retain the shape of the edges during the time that the board is subjected to the forming rolls, altho plates 15 may be advantageously located on each side of the machine to contact with the edges, thereby preventing any deformation which might occur when the board is subjected to the forming rolls.

It will be obvious from the foregoing disclosure, that my invention is not limited to the details of the illustrative embodiment above described, since these may be variously modified. Moreover, it is not indispensable that all features of my invention be used conjointly, since it will be obvious to those skilled in the art, that various schemes may be advantageously employed in various other combinations and subcombinations.

Having described one embodiment of my invention, I claim:

1. A plaster board comprising a plaster body, cover sheets for facing the body, margins on one of the cover sheets being folded over the edge of the body and retroverted, and plaster material inclosed within the folds to reenforce the edge of the board.

2. A plaster board comprising a plaster body, cover sheets for facing opposite sides of the body, margins of one cover sheet being upturned over the edge of the body and retroverted to reenforce the upturned edge and a substantial portion of sheet adjacent the upturned edge, and plaster material inclosed within the retroverted margin.

3. In an article of manufacture, a fibrous sheet, margins of the sheet folded at an angle to the said sheet to provide upturned edges and then retroverted, and an adhesive material for bonding the margins of the sheet.

4. In an article of manufacture, a fibrous sheet having the margins thereof folded at an angle to provide reenforced upturned edges between which a plastic mass is adapted to be contained, and means for retaining the margins in folded position.

5. In an article of manufacture, a fibrous sheet having the margins thereof folded at an angle to provide reenforced upturned edges between which a plastic mass is adapted to be contained, and plaster means bonded to the margins to retain same in folded position.

6. In an article of manufacture, a fibrous sheet having the margins thereof folded at an angle thereto to provide upturned edges, a plaster material deposited on the sheet adjacent the folded edge, and an extension of the margins retroverted towards the sheet to enclose the plaster material.

7. The method of fabricating composition board characterized by feeding a film of adhesive along the margins of a fibrous sheet, folding the margins of the sheet at an angle thereto to provide upturned edges, and compressing the adhesive into contact with the folded margins.

8. The method of fabricating composition board characterized by feeding a ribbon of adhesive along the margins of a fibrous sheet, folding the margins of the sheet at an angle thereto to provide upturned edges, retroverting a portion of the margins over the adhesive, applying pressure to the adhesive, and filling the space between the upturned edges with plastic material.

9. The method of fabricating composition board characterized by feeding a ribbon of plastic material along the margins of a fibrous sheet, folding the margins of the sheet at an angle thereto, retroverting a portion of the margins over the plastic material, accelerating the setting of the plastic material to support the folding margins, feeding a plastic material between the folded margins, and adhering a face sheet to the plastic material.

10. The method of fabricating composition board by feeding a ribbon of plastic material along the margins of a fibrous sheet, folding the margins at an angle to the sheet, applying pressure to the plastic ribbon, depositing plastic material between the folded margins, and facing the plastic material with a cover sheet.

11. The method of fabricating composition board characterized by feeding a colored plastic material along the margins of a fibrous sheet, retroverting the margins over the colored plastic material, folding the retroverted margins at an angle to the sheet to provide edges, depositing plastic material between the edges, and adhering a cover sheet to the plastic material.

In testimony whereof I affix my signature.

ALEXANDER S. SPEER.